United States Patent
Lundy et al.

(10) Patent No.: US 7,744,046 B1
(45) Date of Patent: Jun. 29, 2010

(54) MOUNTING DEVICE FOR ELECTRONIC FISH FINDER SCREEN

(76) Inventors: Darron R. Lundy, 45 104th Ave. NE., Blaine, MN (US) 55434; William Osten, 3601 15th Avenue Ct., Anoka, MN (US) 55303

(*) Notice: Subject to any disclaimer, the term of this patent is extended or adjusted under 35 U.S.C. 154(b) by 98 days.

(21) Appl. No.: 12/202,970

(22) Filed: Sep. 2, 2008

(51) Int. Cl.
*F16L 3/00* (2006.01)

(52) U.S. Cl. .................. 248/121; 248/146; 248/219.2; 248/635

(58) Field of Classification Search ............. 248/177.1
See application file for complete search history.

(56) References Cited

U.S. PATENT DOCUMENTS

| | | | | |
|---|---|---|---|---|
| 1,552,104 | A * | 9/1925 | Zahner | 248/188.5 |
| 2,418,067 | A * | 3/1947 | Carpenter, Sr. | 206/578 |
| 2,479,720 | A * | 8/1949 | Brandt | 248/123.2 |
| 4,347,013 | A | 8/1982 | Turner et al. | |
| 4,352,218 | A * | 10/1982 | Lundberg | 114/363 |
| D272,658 | S * | 2/1984 | Schoenig | D26/138 |
| 4,642,931 | A * | 2/1987 | Flores | 43/21.2 |
| 4,646,669 | A * | 3/1987 | Frank | 114/39.22 |
| 4,927,109 | A * | 5/1990 | Wilson | 248/354.3 |
| 5,435,093 | A * | 7/1995 | Minorics et al. | 43/19.2 |
| 5,461,817 | A * | 10/1995 | Flood | 43/19.2 |
| 5,490,599 | A * | 2/1996 | Tohidi | 211/171 |
| 5,685,107 | A * | 11/1997 | Sweet | 43/21.2 |
| 5,685,510 | A | 11/1997 | Frankish | |
| 5,957,419 | A * | 9/1999 | Lancaster et al. | 248/188.1 |
| 5,992,805 | A * | 11/1999 | Tanner | 248/161 |
| 6,019,325 | A * | 2/2000 | Dotson et al. | 248/121 |
| 6,282,084 | B1 * | 8/2001 | Goerdt et al. | 361/679.55 |
| 6,289,627 | B1 * | 9/2001 | Gibbs et al. | 43/21.2 |
| D455,949 | S | 4/2002 | Huang | |
| 6,366,313 | B1 | 4/2002 | Hall | |
| D460,078 | S | 7/2002 | Li | |
| 6,581,890 | B2 * | 6/2003 | Johnson et al. | 248/161 |
| 6,796,863 | B1 * | 9/2004 | Oathout | 440/104 |
| 7,409,921 | B1 * | 8/2008 | Jones | 114/362 |
| 7,434,772 | B1 * | 10/2008 | Jou | 248/124.2 |
| 2003/0071098 | A1 * | 4/2003 | Martin | 224/405 |
| 2004/0011938 | A1 | 1/2004 | Oddsen, Jr. | |

* cited by examiner

*Primary Examiner*—J. Allen Shriver, II
*Assistant Examiner*—Alaeddin Mohseni

(57) ABSTRACT

A mounting device for an electronic fish finder screen comprising a vertical mounting component connected perpendicularly to a horizontal mounting component via a joining component, wherein the height of the vertical mounting component can be adjusted by moving a locking pin on the vertical mounting component to various adjustment apertures disposed along the length of the vertical mounting component. A mounting platform is attached to the vertical mounting device to support an electronic fish finder screen.

1 Claim, 5 Drawing Sheets

MOUNTING DEVICE FOR ELECTRONIC FISH FINDER SCREEN

FIELD OF THE INVENTION

The present invention is directed to a device for mounting an electronic fish finder screen in a boat.

BACKGROUND OF THE INVENTION

The present invention features a mounting device for an electronic fish finder screen comprising a vertical mounting component connected perpendicularly to a horizontal mounting component via a joining component, wherein the height of the vertical mounting component can be adjusted by moving a locking pin on the vertical mounting component to various adjustment apertures disposed along the length of the vertical mounting component. A mounting platform is attached to the vertical mounting device to support an electronic fish finder screen.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
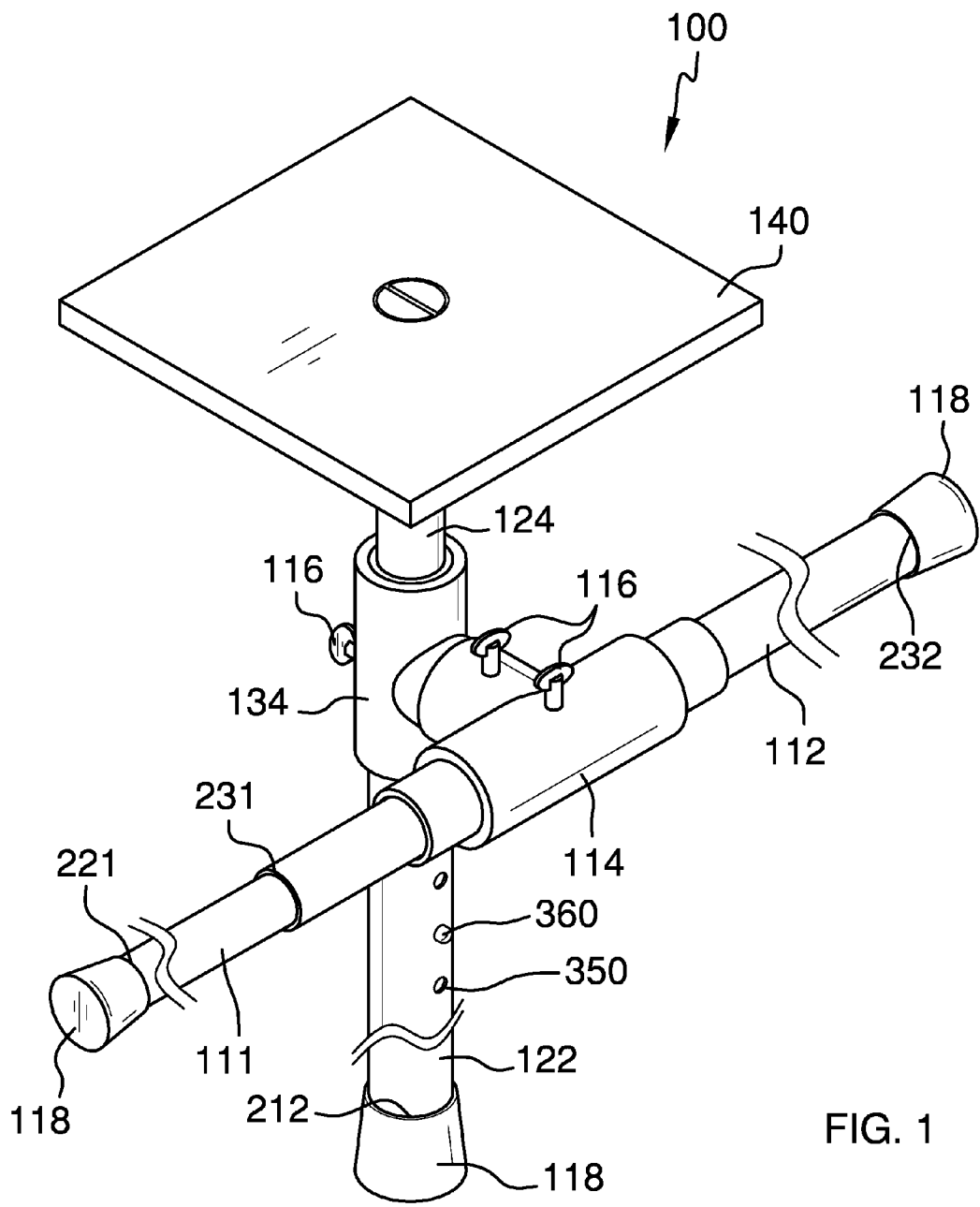
FIG. 1 is an illustration of the mounting device of the present invention.
Figure 2:
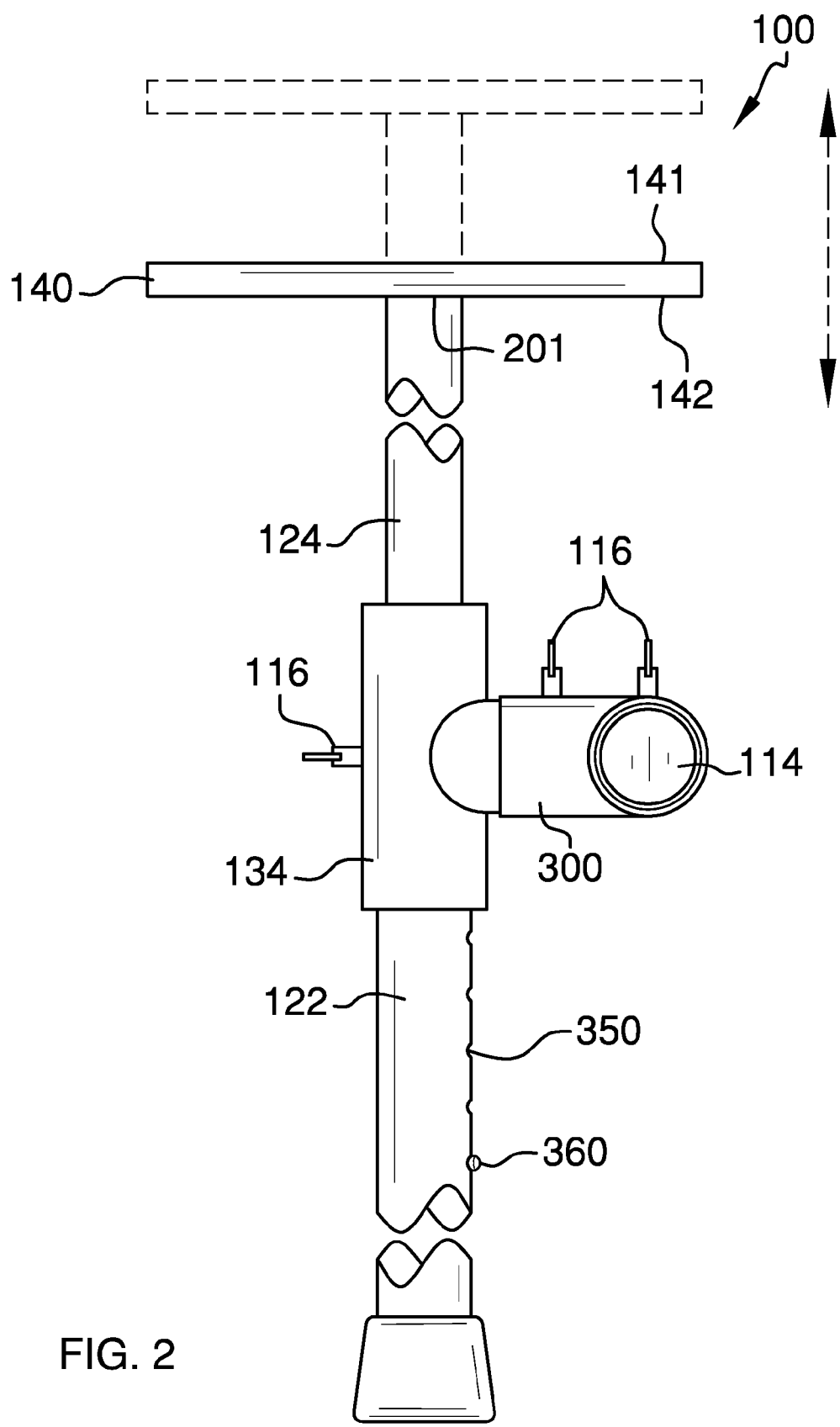
FIG. 2 is a side view of the mounting device of the present invention.
Figure 3:
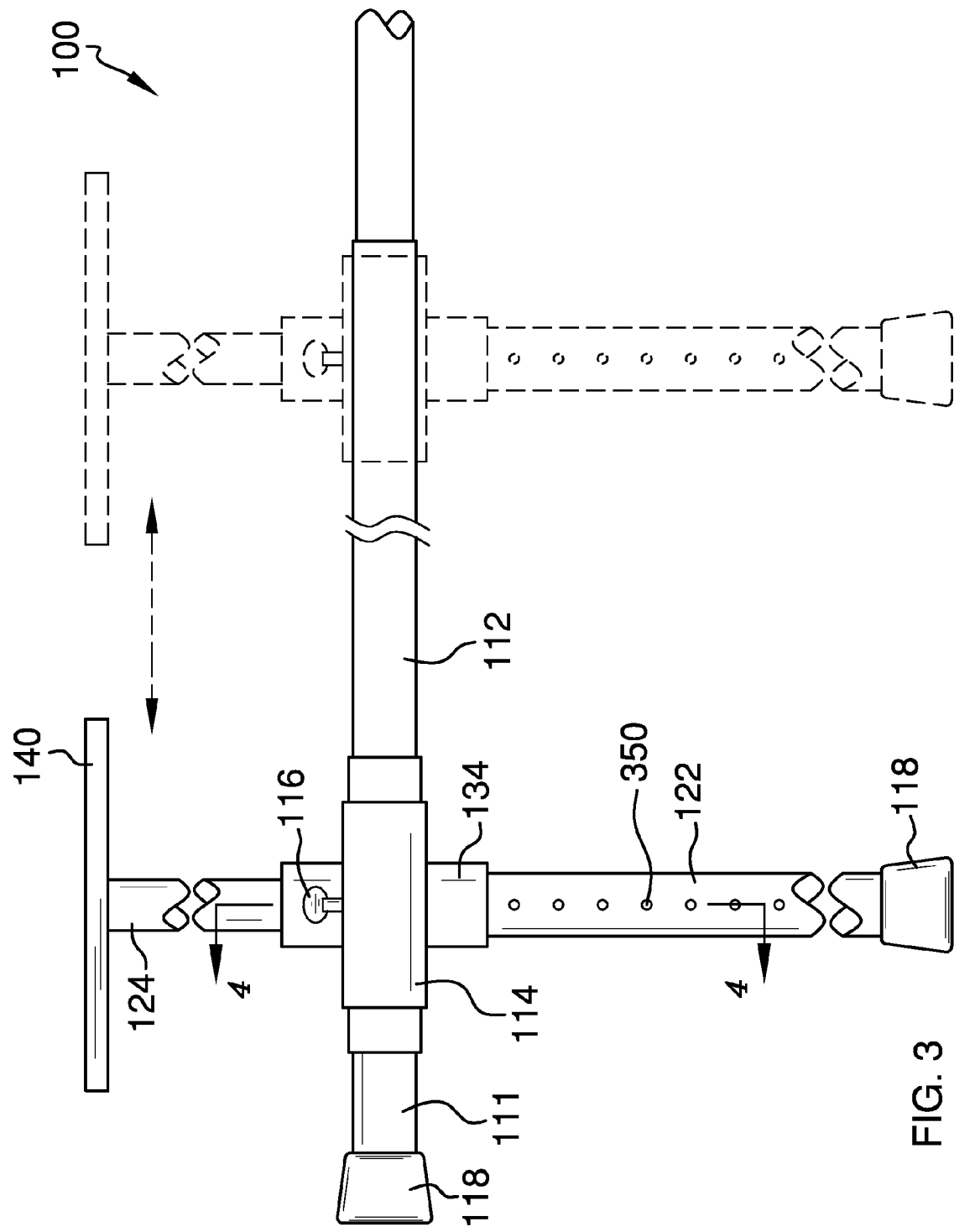
FIG. 3 is a front view of the mounting device of the present invention.
Figure 4:
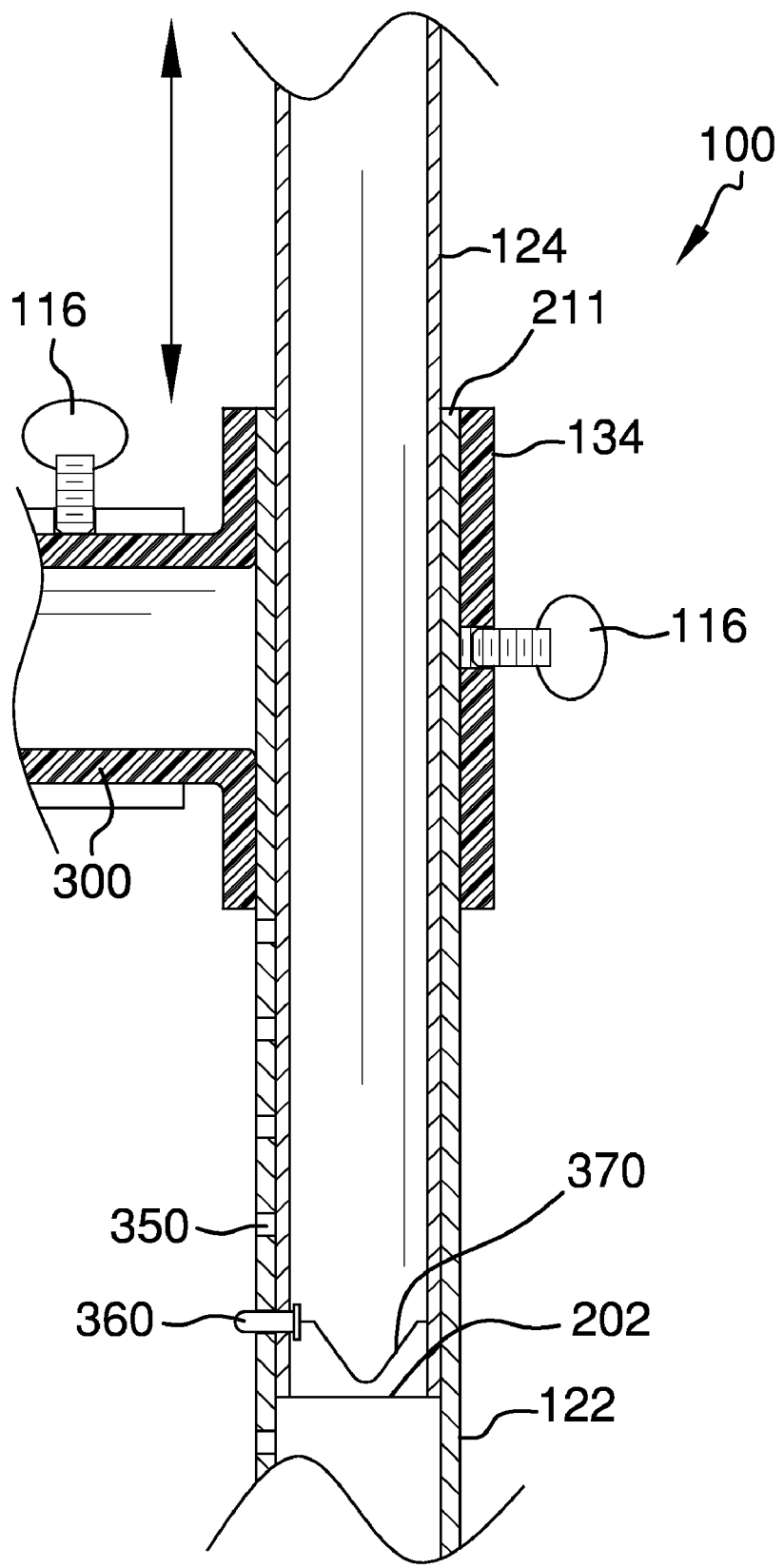
FIG. 4 is a side view and cross-sectional view of the mounting device of the present invention.
Figure 5:
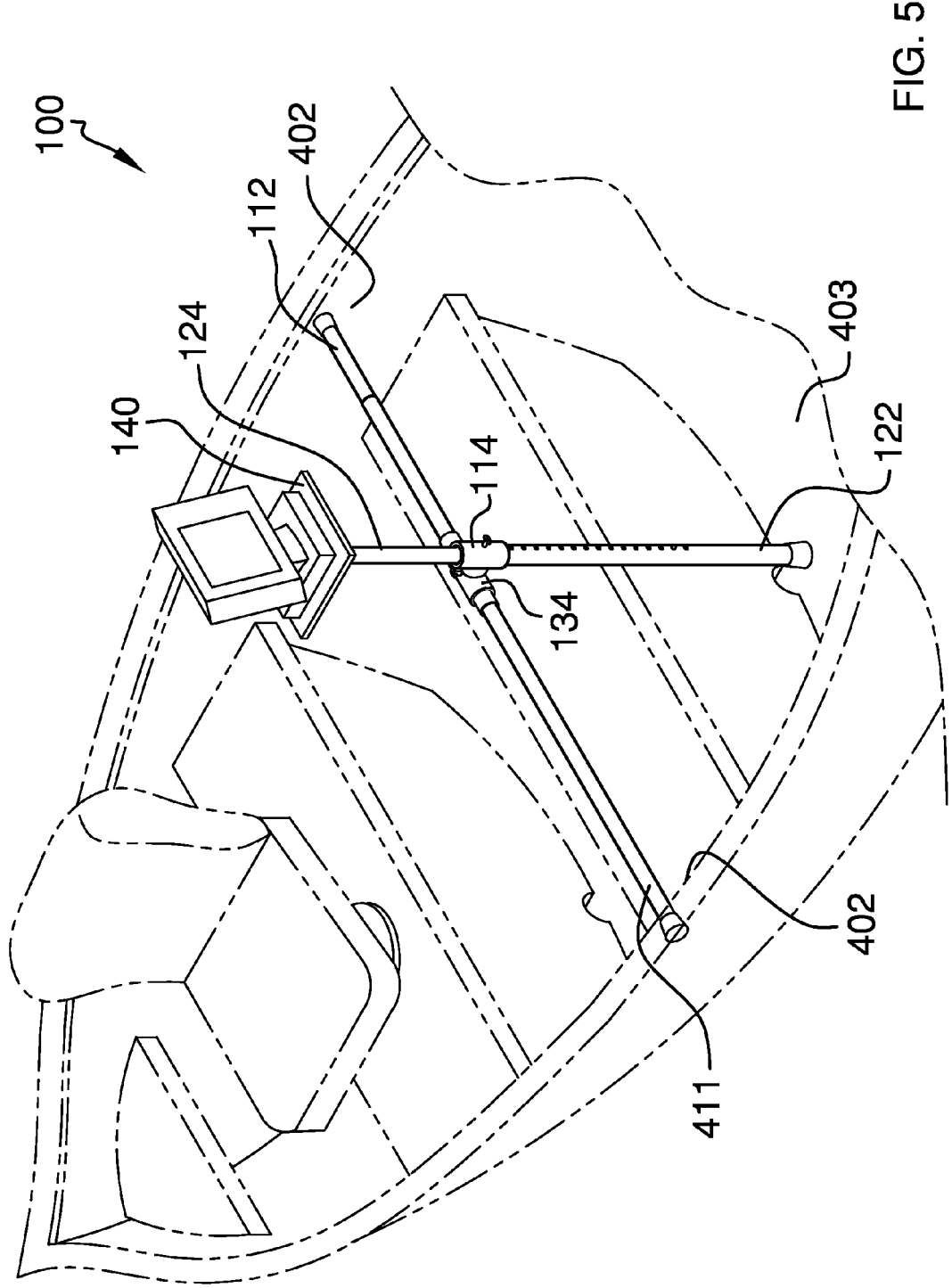
FIG. 5 is a perspective view of the mounting device of the present invention as installed in a boat.

The following is a listing of numbers corresponding to a particular element refer to herein:
100 mounting device
111 first side pole
112 second side pole
114 horizontal collar of joining component
116 thumbscrew
118 stopper
122 bottom pole
124 top pole
134 vertical collar of joining component
140 mounting platform
141 top surface of mounting platform
142 bottom surface of mounting platform
201 first end of top pole
202 second end of top pole
211 first end of bottom pole
212 second end of bottom pole
221 first end of first side pole
231 first end of second side pole
232 second end of second side pole
300 connecting collar of joining component
350 adjustment aperture
360 locking pin
370 spring
400 fish finder screen
402 side of boat
403 floor of boat Referring now to FIGS. 1-5, the present invention features a mounting device for mounting an electronic fish finder screen in a boat. The mounting device of the present invention comprises a vertical mounting component connected to a horizontal mounting component to form a T-shaped mounting device. For example, the horizontal mounting component is substantially perpendicular to the vertical mounting component.

The vertical mounting component comprises a top pole having a first end and a second end telescopically insertable into to a bottom pole having a first end and a second end. The second end of the top pole is inserted into the first end of the bottom pole. In some embodiments, the horizontal mounting component is a spring tension rod. In some embodiments, the horizontal mounting component comprises a first side pole having a first end and a second end telescopically insertable into a second side pole having a first and a second end. The second end of the first side pole is inserted into the first end of the second side pole.

The vertical mounting component is oriented in a vertical position such that the second end of the bottom pole rests on the ground surface (e.g., floor of boat). The horizontal mounting component is oriented in a horizontal position anchored in between the two sides of the boat.

Disposed on the first end of the first side pole, the second end of the second side pole, and the second end of the bottom pole is a stopper. The stopper is for preventing the respective ends of the poles from scratching the sides/bottom of the boat as well as helping anchor the mounting device in place.

Both the vertical mounting component and the horizontal mounting component have a center portion. The center portion of the vertical mounting component and the center portion of the horizontal mounting component are connected together via a joining component. The joining component comprises a vertical collar and a horizontal collar connected via a connecting collar, wherein the vertical mounting component is insertable into the vertical collar and the horizontal mounting component is insertable into the horizontal collar. The vertical mounting component can freely slide in the vertical collar of the joining component. The horizontal mounting component can freely slide in the horizontal collar of the joining component.

Disposed in the vertical collar is a first thumbscrew which can be screwed in a first direction (e.g., clockwise) and a second direction (e.g., counterclockwise). The first thumbscrew is for clamping down on the vertical mounting component to anchor the vertical mounting component in place within the vertical collar. For example, when the first thumbscrew of the vertical collar is loose (e.g., is not clamping the vertical mounting component), the position of the joining component can be adjusted along the length of the vertical mounting component by sliding the joining component upwards or downwards. When the joining component is oriented in the position of the user's choice, the first thumbscrew can be screwed in a first direction (e.g., clockwise) to clamp the vertical mounting component within the vertical collar so that the joining component cannot move upwards or downwards along the length of the vertical mounting component.

Disposed in the horizontal collar is a second thumbscrew which can be screwed in a first direction (e.g., clockwise) and a second direction (e.g., counterclockwise). The second thumbscrew is for clamping down on the horizontal mounting component to anchor the horizontal mounting component in place within the horizontal collar. For example, when the second thumbscrew of the horizontal collar is loose (e.g., is not clamping the horizontal mounting component), the position of the joining component can be adjusted along the length of the horizontal mounting component by sliding the joining component from side to side. When the joining component is oriented in the position of the user's choice, the second thumbscrew can be screwed in a first direction (e.g., clockwise) to clamp the horizontal mounting component within the horizontal collar so that the joining component cannot move side to side along the length of the horizontal mounting component.

Disposed on the top pole is a locking pin moveable between an in position and an out position. The locking pin is biased in an out position caused by a spring disposed in the top pole connecting to the locking pin (see FIG. 4). Disposed along the length of the bottom pole is a plurality of adjustment apertures. The adjustment apertures are for receiving the locking pin disposed on the top pole. The height of the vertical mounting component can be adjusted by pushing the locking pin to the in position and sliding the top pole up or down within the bottom pole. When the poles are in the position of the user's choice, the locking pin can be aligned with an adjustment aperture such that the locking pin returns to the out position and locks the bottom pole in place. In some embodiments, a plurality of adjustment apertures is disposed on the second side pole and a locking pin is disposed on the first side pole so that the horizontal mounting component can be adjusted.

The mounting device of the present invention further comprises a mounting platform having a top surface and a bottom surface, wherein the bottom surface of the mounting platform is attached to the first end of the top pole of the vertical mounting component. The mounting platform is for supporting the electronic fish finder screen.

In some embodiments, the bottom surface of the mounting platform is attached to the top pole via a clip. In some embodiments, a hole is disposed in the mounting platform for attaching the platform to the top pole.

The mounting device of the present invention may be constructed from a variety of materials. For example, in some embodiments, the mounting device is constructed from a material comprising a metal (e.g., stainless steel), a plastic, the like, or a combination thereof. In some embodiments, the joining component is constructed from a material comprising a plastic (e.g., polyvinylchloride), a metal, the like, or a combination thereof. In some embodiments, the stopper is constructed from a material comprising a rubber, a plastic, the like, or a combination thereof.

As used herein, the term "substantially perpendicular" refers to forming between an eighty five degree angle and a ninety five degree angle.

As used herein, the term "about" refers to plus or minus 10% of the referenced number. For example, an embodiment wherein the first side pole is about 10 inches in height includes a first side pole that is between 9 and 11 inches.

The mounting device of the present invention may be constructed in a variety of sizes. For example, in some embodiments, the top pole and/or first side pole has an outer diameter of about 0.875 inches. In some embodiments, the top pole and/or the first side pole has an outer diameter between about 0.5 to 0.875 inches. In some embodiments, the top pole and/or first side pole has an outer diameter between about 0.875 to 1.5 inches. In some embodiments, the top pole and/or first side pole has an outer diameter between about 1.5 to 3 inches. In some embodiments, the top pole and/or first side pole has an outer diameter greater than about 3 inches.

In some embodiments, the bottom pole and/or second side pole has an outer diameter of about 1.0 inch. In some embodiments, the bottom pole and/or second side pole has an outer diameter between about 0.875 to 1.5 inches. In some embodiments, the bottom pole and/or second side pole has an outer diameter between about 1.5 to 3 inches. In some embodiments, the bottom pole and/or second side pole has an outer diameter between about 3 to 5 inches. In some embodiments, the bottom pole and/or second side pole has an outer diameter greater than about 5 inches.

In some embodiments, the top pole is about 29.4 inches in length as measured from the first end to the second end. In some embodiments, the bottom pole is about 34 inches in length as measured from the first end to the second end. In some embodiments, the first side pole is about 21.3 inches in length as measured from the first end to the second end. In some embodiments the second side pole is about 21.7 inches in length as measured from the first end to the second end. In some embodiments, the top pole and/or bottom pole and/or first side pole and/or second side pole is between about 10 to 20 inches in length as measured from the first end to the second end. In some embodiments, the top pole and/or bottom pole and/or first side pole and/or second side pole is between about 20 to 30 inches in length as measured from the first end to the second end. In some embodiments, the top pole and/or bottom pole and/or first side pole and/or second side pole is between about 30 to 40 inches in length as measured from the first end to the second end.

The following the disclosures of the following U.S. Patents are incorporated in their entirety by reference herein: U.S. Pat. No. 5,685,510; U.S. Pat. No. 4,347,310; U.S. Pat. No. 6,366,313 B1; U.S. Pat. No. 6,019,325; U.S. Pat. Application No. 2004/0011938 A1.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A mounting device for mounting an electronic fish finder screen in a boat having a first side, a second side, and a floor, said mounting device comprising:
   (a) a vertical mounting component comprising a top pole having a first end and a second end telescopically insertable into a bottom pole having a first end and a second end, wherein the vertical mounting component is oriented in a vertical position such that the second end of the bottom pole rests on the floor of the boat;
   (b) a horizontal mounting component comprising a first side pole having a first end and a second end telescopically insertable into a second side pole having a first and a second end, wherein the horizontal mounting component is oriented in a horizontal position anchored in between the first side of the boat and the second side of the boat;
   (c) a joining component for connecting the vertical mounting component to the horizontal mounting component, said joining component comprising a vertical collar and a horizontal collar connected via a connecting collar, wherein the vertical mounting component is insertable into the vertical collar and can freely slide in the vertical collar, wherein the horizontal mounting component is insertable into the horizontal collar and can freely slide in the horizontal collar of the joining component;

(d) a first thumbscrew disposed in the vertical collar, wherein the first thumbscrew can be screwed in a first direction and a second direction, wherein the first thumbscrew is for clamping down on the vertical mounting component to anchor the vertical mounting component in place within the vertical collar;

(e) a second thumbscrew disposed in the horizontal collar, wherein the second thumbscrew can be screwed in a first direction and a second direction, wherein the second thumbscrew is for clamping down on the horizontal mounting component to anchor the horizontal mounting component in place within the horizontal collar;

(f) a locking pin disposed on the top pole, said locking pin moveable between an in position and an out position, wherein the locking pin is biased in an out position caused by a spring disposed in the top pole;

(g) a plurality of adjustment apertures disposed along the length of the bottom pole, said adjustment apertures for receiving the locking pin disposed on the top pole;

(h) a mounting platform having a top surface and a bottom surface, wherein the bottom surface, of the mounting platform is attached to the first end of the top pole of the vertical mounting component, wherein the mounting platform is for supporting the electronic fish finder screen; and (i) a stopper disposed on the first end of the first side pole, the second end of the second side pole, and the second end of the bottom pole for preventing the first end of the first pole, the second end of the side pole, and the second end of the bottom pole from scratching the first side of the boat, the second side of the boat, and the floor of the boat, respectively;

wherein the vertical mounting component connects substantially perpendicularly to the horizontal mounting component via the joining, component to form a generally T-shaped mounting device insertable in between the first side of the boat and the second side of the boat;

wherein the height of the vertical mounting component can be adjusted by pushing the locking pin to the in position, sliding the top pole up or down within the bottom pole, and aligning the locking pin with an adjustment aperture such that the locking pin returns to the out position and locks the bottom pole-in place.

\* \* \* \* \*